Dec. 27, 1966  R. W. LARSON  3,294,131

SHEAR CLAMPING MECHANISM

Filed Jan. 12, 1966  4 Sheets-Sheet 2

INVENTOR.
ROBERT W. LARSON
BY
Meyers & Peterson
ATTORNEYS

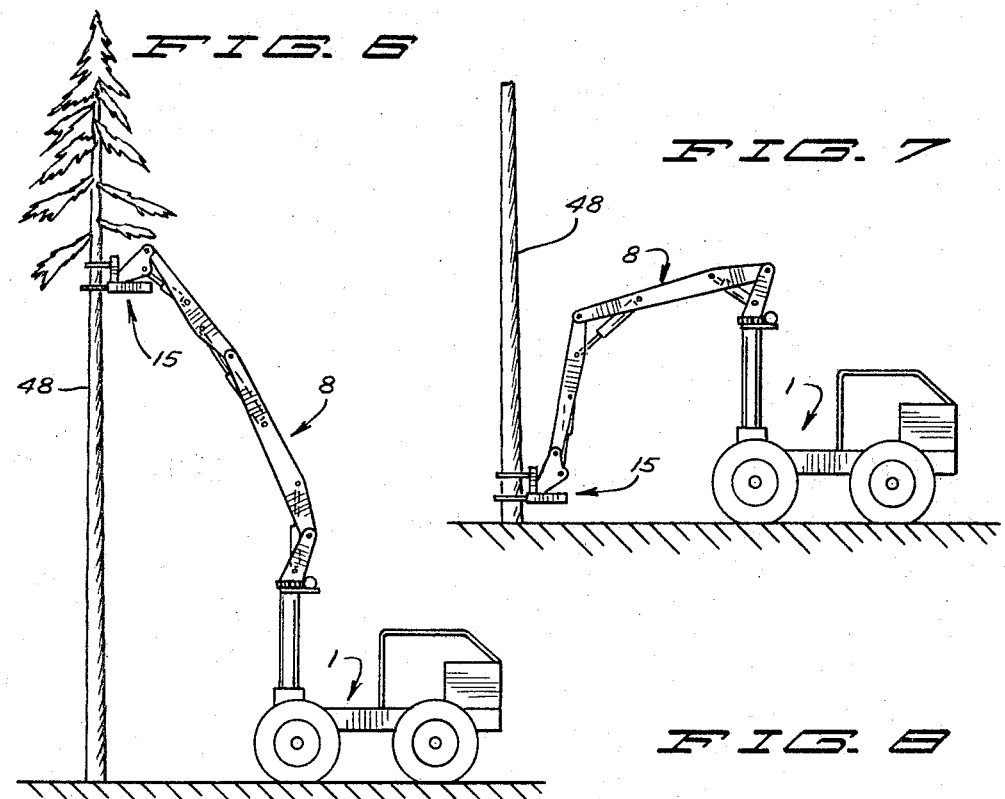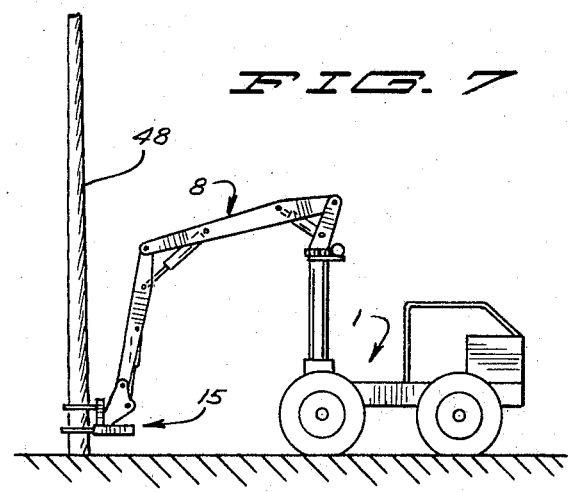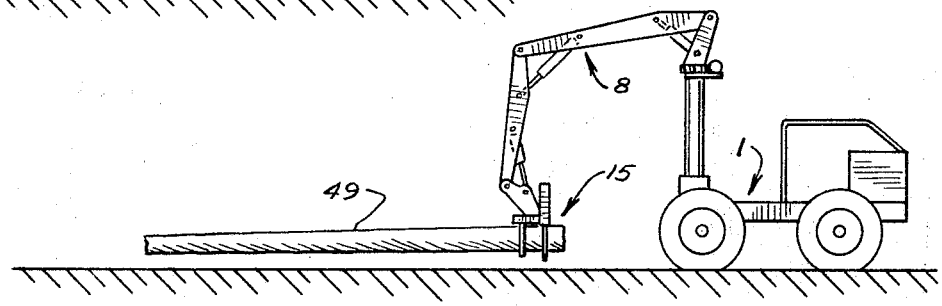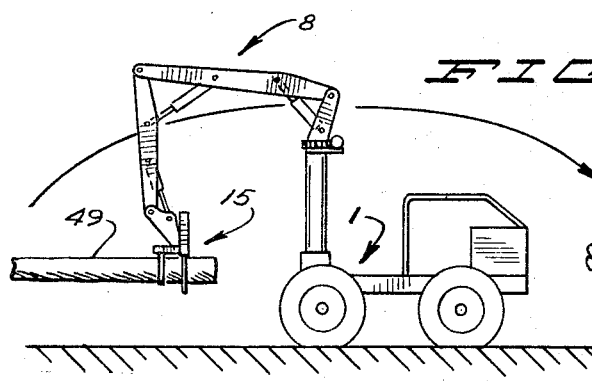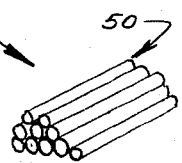

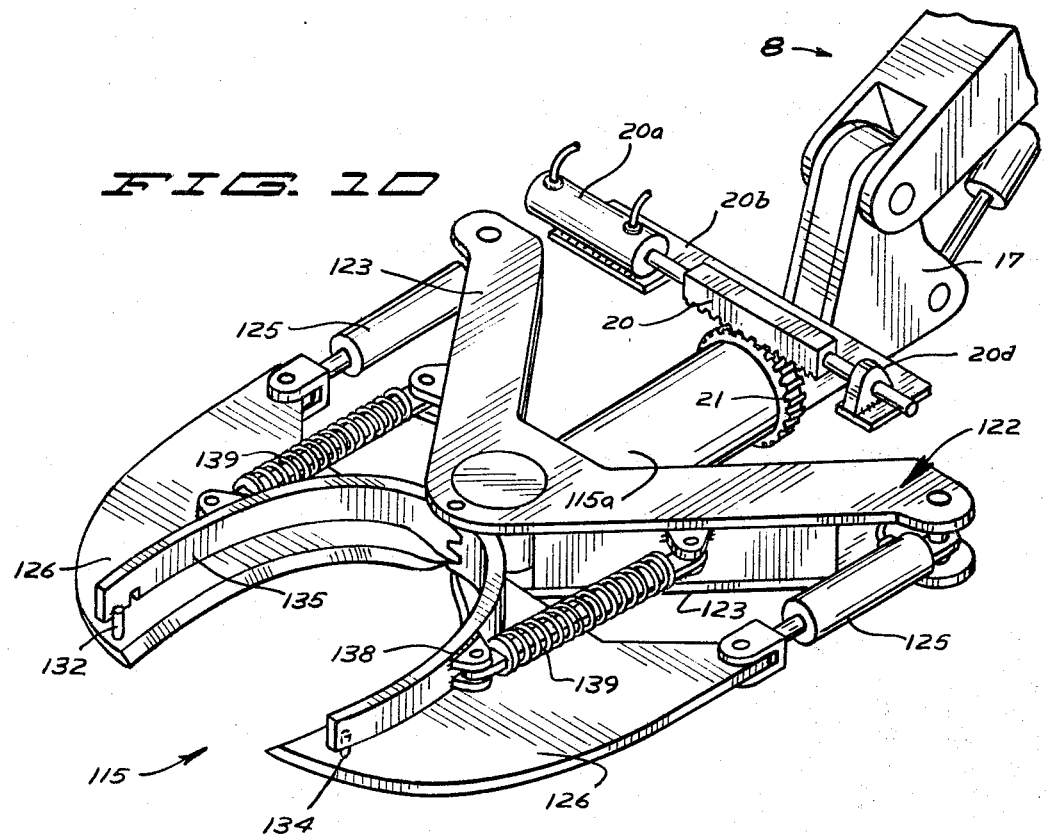
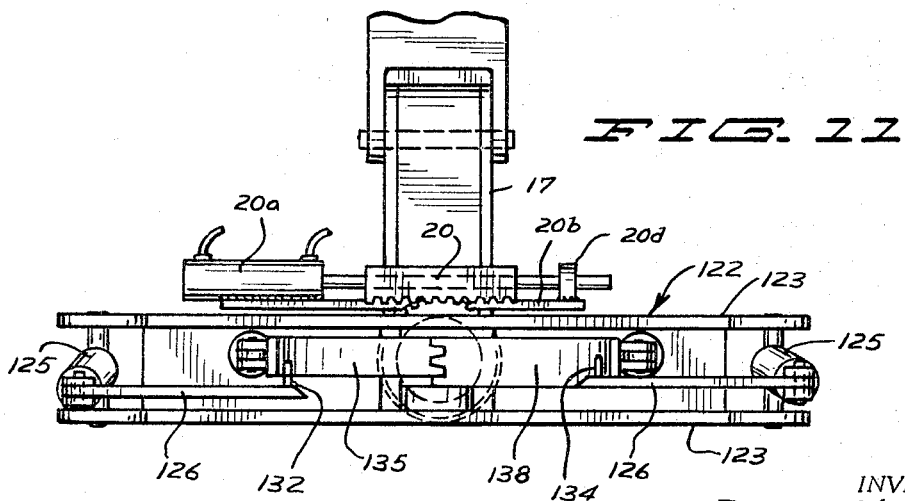

United States Patent Office 3,294,131
Patented Dec. 27, 1966

3,294,131
SHEAR CLAMPING MECHANISM
Robert W. Larson, Ashland, Wis., assignor to Beloit Corporation, Beloit, Wis., a corporation of Wisconsin
Filed Jan. 12, 1966, Ser. No. 520,236
4 Claims. (Cl. 144—34)

This application is a continuation-in-part of my copending application, Ser. No. 296,540, filed July 22, 1965, now abandoned.

This invention relates to shears and more particularly to a combined shear-clamping mechanism for use in tree harvesting apparatus.

Accordingly, it is an object of this invention to provide a novel co-operating shear-clamping mechanism for cutting and manipulating trees.

It is another object of this invention to provide a novel shearing means for tree harvesting, adapting the shear for facilitating manipulation of trees cut therewith.

A further object of this invention is to provide a novel shearing means for felling standing trees and facilitating their subsequent manipulation.

Other objects and advantages of this invention will become more apparent from the following description and drawings in which:

FIGURE 5 is a partial plan view of the shear-clamping mechanism, illustrating the relative positions of the parts after the shears have been closed on a tree;

FIGURES 6 through 9 illustrate various stages in the sequence of operation of this embodiment;

FIGURE 10 is a perspective view illustrating another embodiment of this invention; and FIGURE 11 is a front elevational view of the embodiment shown in FIGURE 10.

Figure 1:
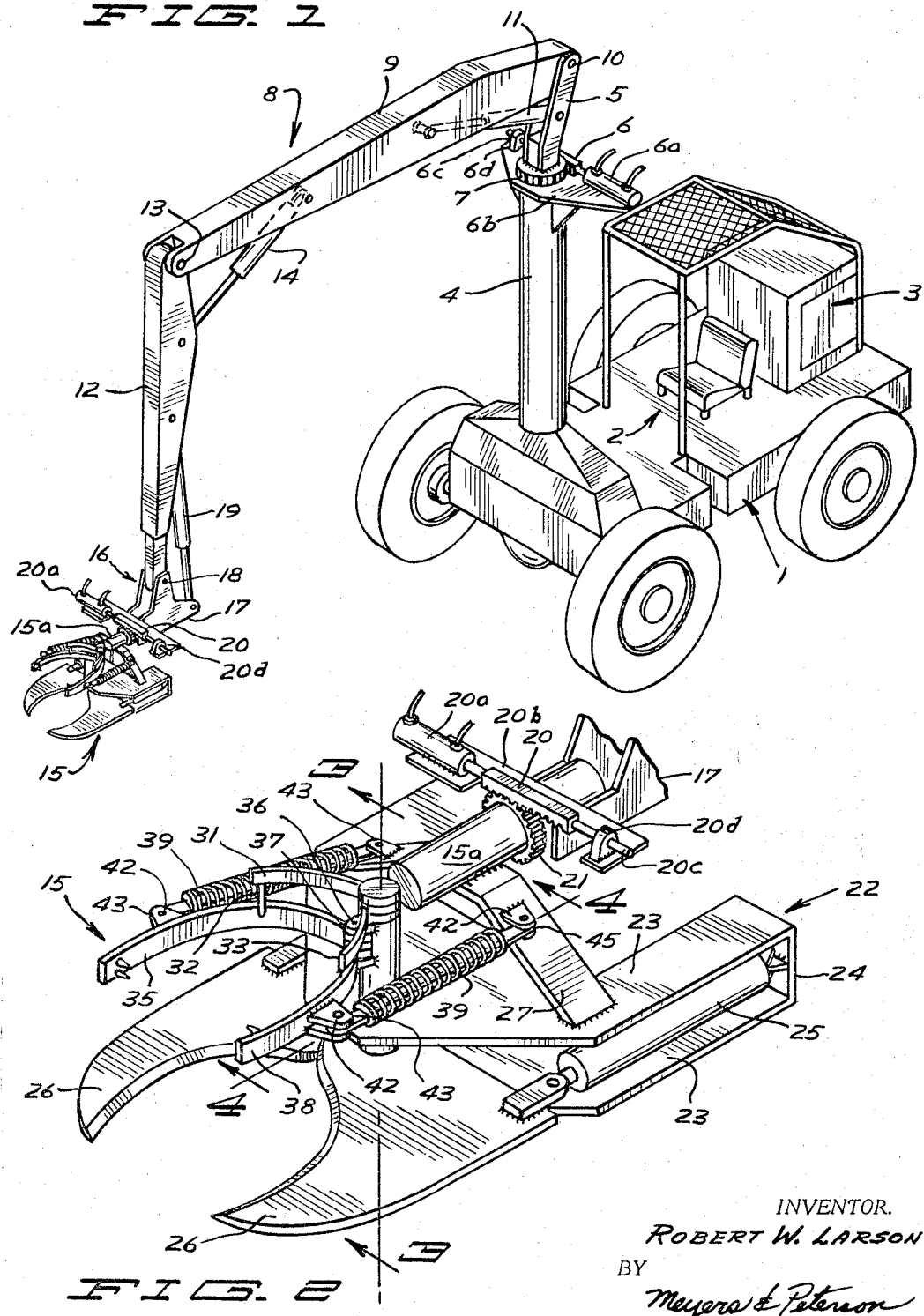
FIGURE 1 is a perspective view of a structure incorporating one embodiment of this invention.
Figure 2:
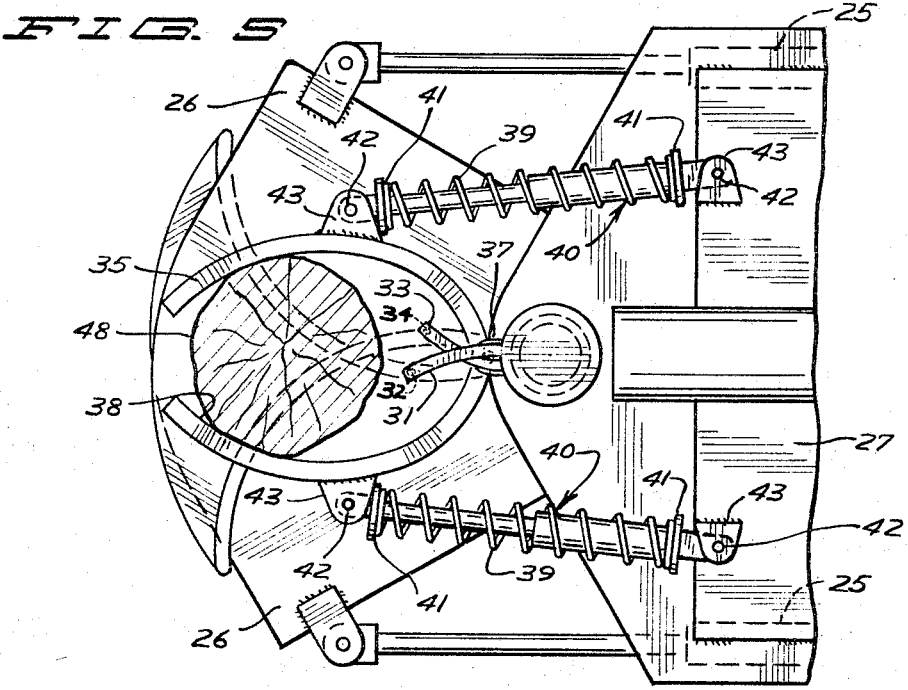
FIGURE 2 is an enlarged perspective view of the shear-clamping mechanism of the structure shown in FIGURE 1.
Figure 3:
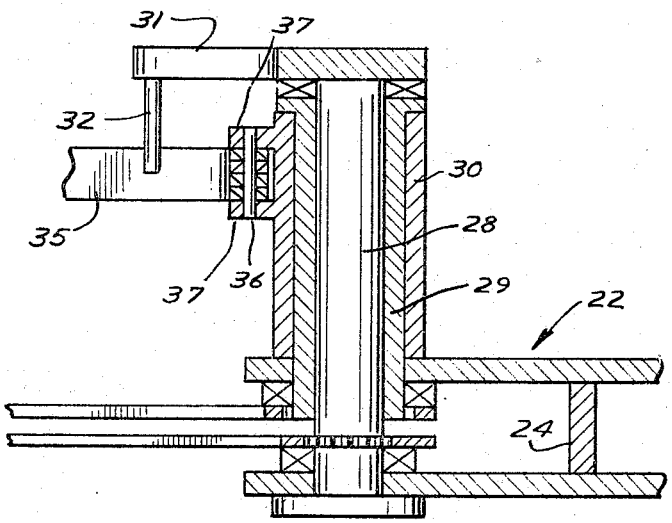
FIGURE 3 is an enlarged sectional view through a portion of the shear-clamping mechanism, taken on the line 3—3 of FIGURE 2.

Referring now to the drawings in detail, FIGURE 1 illustrates generally a mobile vehicle or carriage 1 which may assume any desired mechanical construction but which includes essentially an operator's cab 2 and an engine 3 for propelling the vehicle as well as for providing hydraulic power for various hydraulic motors yet to be described. Carried at the forward portion of vehicle 1 is an upright post or standard 4 which has at its upper end a bracket 5 mounted for rotation about a vertical axis. Powered rotational movement of bracket 5 is accomplished by means of a rack and pinion assembly consisting of a conventional rack 6 cooperating with a pinion 7 connected to bracket 5. Rack 6 is reciprocated by means of a double-acting hydraulic motor 6a connected thereto, motor 6a being mounted on a platform 6b carried at the top of post 4. For additional support, rack 6 may be provided with a projecting shaft 6c at the end thereof opposite from motor 6a, shaft 6c being slidably guided in a bearing block 6d affixed to platform 6b.

Indicated generally by the reference number 8 is an articulated reach boom assembly mounted on the bracket 5. The reach boom assembly 8 includes a first or rear boom section 9 pivotally connected to bracket 5 by means of a pivot pin or shaft 10 for pivotal movement in a vertical plane relative to post or standard 4. Raising or lowering of the boom section 9 is accomplished by means of a double acting hydraulic motor 11 pivotally connected in conventional manner between the boom section 9 and the bracket 5.

Boom assembly 8 further includes a second or front boom section 12 pivotally connected to the rear boom section 9 by means of a pivot shaft 13. Relative movement between the front and rear boom sections 9 and 12 is effected by means of a double acting hydraulic motor 14 pivotally connected to and between the boom sections 9 and 12. A shear-clamping mechanism generally indicated at 15 is supported at the distal end of the front boom section 12 for pivotal and rotational movement by means of a universal connection 16 which includes a bell crank 17 pivotally mounted at the distal end of the front boom section 12 by means of pivot shaft 18, adapting the shear-clamping mechanism 15 for angular movement in a vertical plane. This angular motion is effected by means of a double acting hydraulic motor 19 pivotally connected between and to the bell crank 17 and the front mast section 12.

Shear-clamping mechanism 15 is mounted on bell crank 17 for powered pivotal movement about an axis transverse to the axis of shaft 18. Thus, shear-clamping mechanism 15 includes a shaft 15a which is journalled on suitable bearings (not shown) in bell crank 17, and is rotated by means of a rack 20 engaging a pinion 21 which is fixed on shaft 15a. The arrangement for supporting and actuating rack 20 is similar to that associated with rack 6. Thus, rack 20 is powered by a hydraulic motor 20a mounted on a platform 20b fixed to bell crank 17 and the free end of the rack carries a shaft 20c guided in a bearing block 20d. In this manner, as will be appreciated, the shear-clamping mechanism 15 is adapted for movement about two axes transverse to one another, facilitating subsequent manipulation thereof.

The shear-clamping mechanism 15 comprises a frame 22 which, in the illustrated embodiment, is U-shaped in plan, having the legs thereof extending rearwardly toward the vehicle 1. The frame 22 itself may be comprised of spaced plates 23 connected together by means of spacer plates 24 and is adapted to provide support for a pair of hydraulic motors 25 and a pair of shear blades 26. Frame 22 is rigidly attached to shaft 15a by means of a bracket 27 extending between the frame 22 and shaft 15a as shown.

Support frame 22 is provided with overhanging portions receiving therebetween the shear blades 26 which are fixedly attached respectively to a rotatable shaft 28 and an annular sheath or collar 29 in surrounding relation to the shaft 28. Rigid attachment between the shaft 28 and the collar 29 and their corresponding shear blades 26 may be effected in any suitable manner, as for example, by splined fittings. As shown in the drawings, the annular collar 29 and the shaft 28 are rotatably received within a post 30 which is suitably secured to the frame 22. Hydraulic motors 25 are pivotally attached in conventional manner between the shear blades 26 and the frame 22 and, when actuated, will pivot the shear blades about the axis defined by shaft 28 and collar 29 to perform their shearing function.

The pivot shaft 28 has a radially projecting arm or lever 31 secured to the top thereof, arm 31 carrying at its distal end a downwardly projecting detent pin 32 for co-action with one of a pair of clamping members subsequently to be described. A second projecting arm 33 is fixedly secured to the annular collar 29 and likewise carries at its distal end a detent pin 34 for a similar co-action with the second of a pair of clamping members to be described below. As will be appreciated, relative movement between the shear blades 26 effects a corresponding movement in projecting arms 31 and 33 and in their associated detent pins 32 and 34 respectively. Arm 33 is mounted below arm 31 so that the arms may cross each other.

Shear-clamping mechanism 15 also includes a pair of rigid clamping members or jaws 35 and 38 hinged about a common pivot pin 36 carried between a pair of lugs or ears 37, mounted on post 30, thus adapting the jaws 35 and 38 for converging and diverging movement into and out of clamping relation to the tree being sheared. The clamping action of the jaws 35 and 38 is effected by biasing them toward their closed position by means of a pair of spiral springs 39 which provide sufficient force to hold the three when the jaws are permitted to come into contact therewith.

Figure 4:
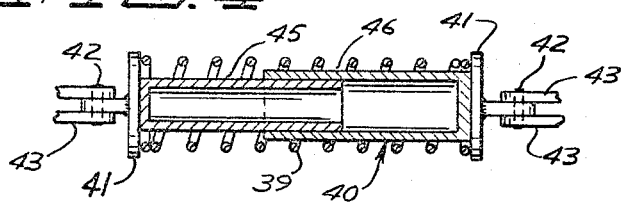
FIGURE 4 is a detailed sectional view taken on the line 4—4 of FIGURE 2.

As shown in FIGURES 4 and 5, springs 39 are mounted in surrounding relation to a pair of guides 40, each of which is provided with a flange 41 against which the ends of the springs abut. Guides 40 are pivotally attached by means of suitable pivot pins 42 and lugs 43 to the bracket 27 and to the respective clamping jaws 35 and 38, to allow the guides to follow the converging and diverging movements of the jaws. To accommodate the extension and compression of springs 39, guides 40 are preferably made up of telescoping tubular elements 45 and 46, as best illustrated in FIGURE 4.

The detent pins 32 and 34 extend downwardly between inwardly facing portions of the clamping jaws 35 and 38, the arrangement being such that the detent pins abut the jaws to limit their converging movement with respect to the shear blades 26. As the shear blades 26 converge toward one another during a shearing operation, the clamping jaws 35 and 38 are constrained to follow the movement of the blades until the surface of the tree being cut is engaged, after which the detent pins 32 and 34 become disengaged from the jaws 35 and 38 since the arms 31 and 33 continue to follow the movement of the shear blades 26.

The relative positions of the parts after the shear blades 26 have closed on a tree 48 of typical diameter is illustrated in FIGURE 5 where the separated or disengaged relation of the arms 31 and 33 from the clamping jaws 35 and 38 is clearly apparent. Of course, the arms 31 and 33 are short enough so that they will clear the tree 48 under all normal conditions. In addition, where as in the present case the arms 31 and 33 must cross each other, as noted above, one of the arms is made shorter so that the detent pin on the opposite arm may clear the free end thereof.

Upon retraction of the shear blades 26, the detent pins 32 and 34 will re-abut the inwardly facing portions of clamping jaws 35 and 38. Thereafter, the jaws will again be constrained to follow the movement of the blades 26 and will thus be separated against the action of springs 39.

In a typical harvesting operation, the vehicle 1 is moved into position, as illustrated in FIGURE 6, to enable it, through the reach boom assembly 8, to position the shear-clamping mechanism 15 at the top of a standing tree 48. The operator then actuates the hydraulic motors 25 to effect convergent movement of the shear blades 26 for the topping of the tree. During the convergent movement of the shear blades 26, the arms 31 and 33 similarly converge toward each other, as do their depending detent pins 32 and 34, to permit the gripping jaws 35 and 38 to be biased by springs 39 into clamping relationship about the portion of the tree just above the cut being made. This clamping action supports the top of the tree thus preventing it at this moment from dropping to the ground. The operator may then actuate the hydraulic motors 25 to retract the shear blades 25 and release the clamping jaws 35 and 38 to thus drop the top of the tree to the ground, or if circumstances require it, he may maintain the clamping action and lower the top to the ground by manipulation of boom assembly 8.

After the topping operation is complete the operator articulates the boom assembly 8 to position the shear-clamping mechanism 15 in encircling relationship about the tree 48 adjacent the bottom thereof, as illustrated in FIGURE 7. The operator then actuates the hydraulic motors 25 to effect the shearing action of the blades 26 and the associated clamping action of gripping jaws 35 and 38. As the bottom cut is being made on tree 48, the gripping jaws 35 and 38 are biased under action of springs 39 to clamp the resultant log, designated 49, and to prevent it from falling to the ground. In order to manipulate the log 49 for subsequent stacking, the operator then actuates the boom assembly 8 so as to maneuver the tree into a substantially horizontal position as illustrated in FIGURE 8. The vehicle 1 may then be moved and the boom assembly 8 manipulated to position the log 49 for placing it upon a stack 50 (FIGURE 9). Of course, any desired manipulation of the log may be aided by means of the rack and pinion units 6 and 7 and 20 and 21, respectively. When the log is in the desired position, the operator again actuates the hydraulic motors 25 so as to cause co-operative opening, through detent pins 32 and 34, of shear blades 26 and the gripping jaws 35 and 38, which frees the log and permits it to drop onto stack 50.

FIGURES 10 and 11 illustrate another embodiment of the present invention, reference numerals in the "100" series being employed to distinguish this embodiment from the preceding one. The shear-clamping mechanism is accordingly designated at 115 in these views and includes a supporting frame 122 which differs somewhat in shape from the frame 22 of the preceding embodiment. Shear-clamping mechanism 115 is, however, pivotally mounted on the boom assembly 8 in substantially the same manner as in the first embodiment, the only difference being that no intervening bracket is required between the frame 122 and the supporting shaft 115a.

In the present embodiment, the shear blades 126 and the clamping jaws 135 and 138, respectively, are mounted between the plates 123 of frame 122 as shown, and no detent arms are utilized. Instead, the shear blades 126 each carry a detent pin, 132 and 134 respectively, in upstanding relation near the outer free ends thereof. Detent pins 132 and 134 extend upwardly between inwardly facing portions of the clamping jaws 135 and 138 and will coact therewith in the same manner as pins 32 and 34 in the previous embodiment to constrain the jaws to follow the movement of the shear blades through part of their travel. In this embodiment, hydraulic motors 125 provide the motive power for shear blades 126 and jaws 135 and 138 are biased into clamping relation by means of springs 139.

Detent pin 132 is located at such a position on the one blade 126 that the free end of the other blade 126 will pass inwardly thereof. The end of jaw 138 will also pass inwardly of detent pin 132 if the diameter of the tree being cut requires that the parts travel that far. To accommodate pin 134 under those circumstances, a notch 152 is provided in jaw 135 which will allow the pin 134 to pass to the opposite side of jaw 135 if necessary.

The second embodiment is operated in the same manner as the first, so that no further description would appear necessary.

Although the invention has been described with reference to specific embodiments and details, various modifications and changes, within the scope of this invention, will be apparent to one skilled in the art and are contemplated to be embraced within the invention.

I claim:
1. A shearing and clamping mechanism for tree harvesting apparatus comprising a support frame, a pair of shear blades mounted on said support frame for movement toward and away from each other, power means for actuating said shear blades in a shearing operation, a pair of rigid clamping jaws mounted on said support frame for movement toward and away from each other to clamp the tree therebetween, spring means connected between said support frame and each of said clamping jaws for urging them into clamping engagement with the tree, and a pair of detent elements, one fixedly secured with respect to each of said shear blades for movement therewith, said detent elements being located between inwardly facing portions of said clamping jaws to abut said portions and thereby constrain said clamping jaws to follow the shearing movement of said shear blades until the surface of the tree is engaged and then become disengaged from said portions, and to re-abut said portions to separate said jaws against the action of said spring means upon retraction of said shear blades.

2. A shearing and clamping mechanism for tree harvesting apparatus comprising a support frame, a pair of shear blades pivotally mounted on said support frame for movement toward and away from each other, hydraulic motor means connected between said support frame and each of said shear blades respectively for actuating said blades in a shearing operation, a pair of rigid clamping jaws pivotally mounted on a fixed pivot on said support frame for movement toward and away from each other to clamp the tree therebetween, separate spring means connected between said support frame and each of said clamping jaws for urging them into clamping engagement with the tree, a pair of detent pins one fixedly secured with respect to each of said shear blades for movement therewith, said pins being located between inwardly facing portions of said clamping jaws to abut said portions and thereby constrain said clamping jaws to follow the shearing movement of said shear blades until the surface of the tree is engaged and then become disengaged from said portions, and to re-abut said portions to separate said jaws against the action of said spring means upon retraction of said shear blades.

3. A shearing and clamping mechanism as defined in claim 2, said shear blades being mounted on said support frame for relative rotation about a common axis, a pivot shaft supporting one of said shear blades on said support frame and a collar surrounding said pivot shaft for supporting the other of said shear blades, said clamping jaws being mounted above said shear blades for movement in a plane parallel to the general plane of said shear blades, said pivot shaft and said collar extending above said clamping jaws, a first arm projecting radially from said pivot shaft and overlying said clamping jaws for supporting one of said detent pins in depending relation thereto for engaging one of said portions of said clamping jaws and a second arm projecting radially from said collar in overlying relation to said clamping jaws for supporting the other of said detent pins in depending relation thereto for engaging the other of said portions of said clamping jaws.

4. A shearing and clamping mechanism as recited in claim 2, wherein said clamping jaws are mounted above said shear blades for movement in a plane parallel to the general plane of said shear blades, said detent pins being carried by said shear blades near the outer free ends thereof, respectively, and extending upwardly from said shear blades into position to engage said portions of said clamping jaws.

References Cited by the Examiner

UNITED STATES PATENTS

| | | | |
|---|---|---|---|
| 633,736 | 9/1899 | Schoonover | 30—251 |
| 944,555 | 12/1909 | Holden | 83—600 |
| 2,882,941 | 4/1959 | Pope. | |
| 2,981,301 | 4/1961 | Busch et al. | |
| 3,102,562 | 9/1963 | Horncastle. | |

WILLIAM W. DYER, JR., *Primary Examiner.*

W. D. BRAY, *Assistant Examiner.*